Dec. 15, 1936.    J. L. EDELEN ET AL    2,064,596
CARBURETOR
Filed Sept. 14, 1931
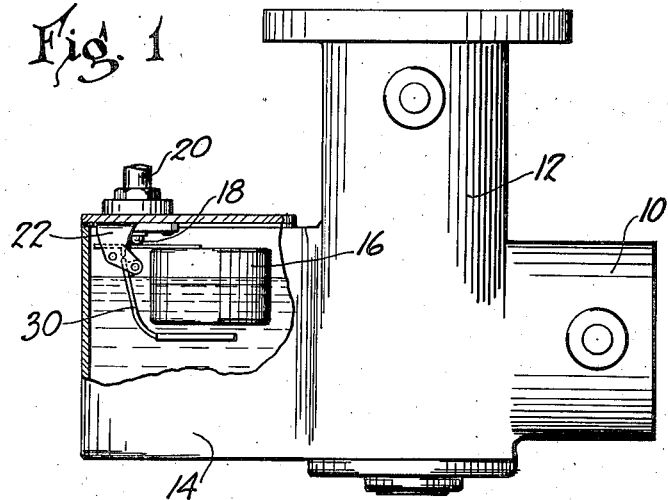
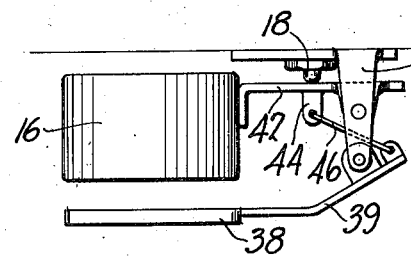
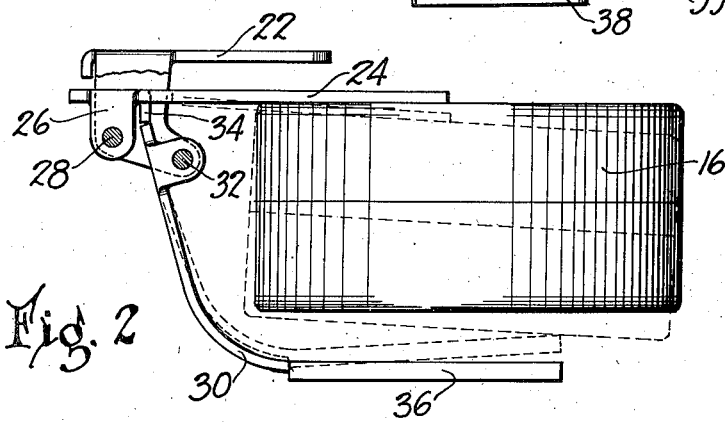
INVENTORS.
James L. Edelen
BY  Scott F. Hunt
ATTORNEY.

Patented Dec. 15, 1936

2,064,596

UNITED STATES PATENT OFFICE 2,064,596

CARBURETOR

James L. Edelen, South Bend, Ind., and Scott F. Hunt, Detroit, Mich., assignors to Bendix Aviation Corporation, South Bend, Ind., a corporation of Delaware Application September 14, 1931, Serial No. 562,617

4 Claims. (Cl. 137—104)

This invention relates to carburetors, and more particularly to float mechanism for maintaining the fuel level in a carburetor at a predetermined level.

An object of the invention is to provide an improved float mechanism wherein the float member is prevented from vibrating or oscillating under the influence of road shocks.

A further object is to provide a float mechanism wherein the float exerts a more positive force upon the fuel inlet valve controlled thereby.

A further object is to prevent unnecessary wear on the fuel inlet valve.

Further objects and advantages of the invention will be apparent from the following description taken in connection with the appended drawing, in which:

Figure 1 is a side elevation of a carburetor provided with a float mechanism embodying the invention, parts being broken away to disclose the construction;

Figure 2 is an enlarged detail of the float mechanism; and

Figure 3 is a detail view of a modification.

The carburetor shown in Figure 1 comprises the usual intake passage 10, body portion 12, and float chamber 14, within which is mounted a float 16 for controlling the fuel inlet valve 18 positioned in the fuel conduit 20. A bracket 22 is fixed to the top of the float chamber, and the supporting member 24 of the float is pivoted to the bracket by means of ears 26 and a pin 28. A counterbalance 30 is also pivoted to the bracket 22 by a pin 32 and has one of its ends contacting with an integral tongue 34 turned downwardly from the supporting member 24, the arrangement being such that rotation of the member 30 in the clockwise direction as viewed in Figures 1 and 2 causes rotation of float 16 about its pivot in the counterclockwise direction.

Counterbalance 30 is provided at its lower end with a baffle 36 which may be in the form of a thickened plate having a weight comparable to that of the float 16 and having an area comparable to the vertical projection of the float. Baffle 36 normally lies parallel to the bottom of float 16 and spaced therefrom by a slight distance so that movement of the baffle and float into contact with each other, as indicated in dotted lines in Figure 2, is resisted by the inertia of the fuel which must be displaced from the space therebetween.

In operation, the float functions in the usual manner until the carbuetor is subjected to a vertical shock, which, if the shock is directed upwardly, tends to cause the float to move downwardly relative to the float chamber by reason of its intertia. The baffle 36, however, will also tend to move downwardly and the result will be that the upper end of member 30 will press against the tongue 34 to maintain the float steady, the movement of the float being resisted by the tendency of the baffle to move in the same direction. The resistance of the fuel to movement of baffle 36, especially toward the float 16, also contributes to the result, which is that the float is maintained in practically a fixed position insofar as sudden movements due to shock are concerned. This improves the action of the carburetor and reduces the wear on the inlet valve 18, the life of which may otherwise be materially shortened by constant oscillation due to road shocks and other causes.

In the modification shown in Figure 3, the baffle 38 is of the same vertical projection as the float 16, and its weight is such that, making allowance for the buoyant force of the fuel and for the different moment arms involved, it will balance the float 16 under all conditions. Baffle 38 is carried by an arm 39 supported by a bracket 40, which also carries the lever 42 to which the float is attached. A projecting ear 44 on the lever 42 is connected, by means of a link 46, to the projecting end of arm 39. In this embodiment it will be noted that movement of the float 16 either upwardly or downwardly can take place only upon movement of the baffle 38 in the opposite direction, and since the shocks to which the carburetor is subjected tend to move both in the same direction the two members steady each other.

While two illustrative embodiments of the invention have been described, it is not our intention to limit the invention thereto or otherwise except in accordance with the terms of the following claims.

We claim:

1. In a carburetor for use in vehicles, a float chamber, a float pivotally mounted therein, a member fixed to the float and arranged to move when the float moves and in the same direction, a counterbalance in the chamber immediately beneath the float, and a member associated with the counterbalance and actuated thereby to move when the counterbalance moves and in the opposite direction and contacting with the first mentioned member to prevent movement of the float under the influence of shocks, said float and counterbalance being provided with parallel closely adjacent surfaces adapted to confine therebetween a body of liquid.

2. In a carburetor, a float chamber, a float, a lever fixed to the float and pivotally related to the float chamber, a counterbalance having a baffle portion extending beneath the float and pivotally related to the float chamber, and a projection on said counterbalance on the opposite side of its pivot from the baffle and connected with said lever to cause movement of the baffle in a downward direction to exert a positive upward force on the float.

3. A carburetor having valve actuating means comprising a float, a member fixed to the float and arranged to move when the float moves and in the same direction, a counterbalance of substantially the same shape as the float actuated by said member to move when the float moves and in the opposite direction and adapted to engage the float to arrest movement of the float under the influence of shocks, said float and counterbalance being provided with parallel closely adjacent surfaces to confine a quantity of liquid therebetween when the float is in the normal operating position and to damp movement of the float by displacing the liquid when the float is moved.

4. In a carburetor having a liquid fuel reservoir valve actuating means comprising a pivotally mounted float, a member arranged to move when the float moves and in the same direction, a counterbalance, a member adapted to move when the counterbalance moves and in the opposite direction and connecting means between said members, said float and counterbalance being provided with parallel closely adjacent surfaces adapted to confine therebetween a quantity of liquid when the float is in the normal operating position and to damp movement of the float by displacing said liquid when the float is moved.

JAMES L. EDELEN.
SCOTT F. HUNT.